US012629834B2

(12) United States Patent
Smith

(10) Patent No.: US 12,629,834 B2
(45) Date of Patent: May 19, 2026

(54) AUGMENTED REALITY SYSTEM AND METHOD FOR CONVEYING TO A HUMAN OPERATOR INFORMATION ASSOCIATED WITH HUMAN-IMPERCEPTIBLE INDICIA WITHIN AN OPERATING ENVIRONMENT OF A ROBOT

(71) Applicant: Sarcos Corp., Salt Lake City, UT (US)

(72) Inventor: Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 638 days.

(21) Appl. No.: 17/368,752

(22) Filed: Jul. 6, 2021

(65) Prior Publication Data

US 2022/0001538 A1 Jan. 6, 2022

Related U.S. Application Data

(60) Provisional application No. 63/048,123, filed on Jul. 4, 2020.

(51) Int. Cl.
*B25J 9/16* (2006.01)
*B25J 9/00* (2006.01)
(Continued)

(52) U.S. Cl.
CPC ........... *B25J 9/1671* (2013.01); *B25J 9/0006* (2013.01); *B25J 9/1689* (2013.01); *B25J 19/023* (2013.01);
(Continued)

(58) Field of Classification Search
CPC ...... B25J 9/1671; B25J 9/0006; B25J 9/1689; B25J 19/023; B25J 9/1656; B25J 13/006;
(Continued)

(56) References Cited

U.S. PATENT DOCUMENTS 8,022,812 B2   9/2011   Beniyama et al.
9,713,871 B2 *   7/2017   Hill ............................ G06T 7/73
(Continued)

FOREIGN PATENT DOCUMENTS

JP   S60-62907 A   4/1985
JP   S63-116286 A   5/1988
(Continued)

OTHER PUBLICATIONS

Meruga et al., Security printing of covert quick response codes using upconverting nanoparticle inks, Nanotechnology, Sep. 11, 2012, 9 pages, vol. 23, IOP Publishing, United Kingdom.
(Continued)

*Primary Examiner* — Khoi H Tran
*Assistant Examiner* — Trang Dang
(74) *Attorney, Agent, or Firm* — Thorpe North & Western, LLP

(57) ABSTRACT

A robotic system comprising a robot, and human-imperceptible indicia associated with an object within an environment, the human-imperceptible indicia comprising or linking to interaction information pertaining to a predetermined intended interaction of the robot with the object, the interaction information facilitating interaction with the object by the robot in accordance with the predetermined intended interaction. The system can comprise a sensor that senses the human-imperceptible indicia and the interaction information, and an augmented reality system for conveying human-understandable information to a human operator, which is associated with the interaction or linking information. The machine readable indicia can comprise symbols that can be sensed and interpreted by the robot or the augmented reality system. The robot can utilize a camera to transmit a real-world view of the operating environment to the augmented reality system that can be combined with the human-under-
(Continued)

standable information to provide augmented reality operation of the robot.

26 Claims, 6 Drawing Sheets

(51) Int. Cl.

| | | |
|---|---|---|
| *B25J 19/02* | (2006.01) |
| *G02B 27/01* | (2006.01) |
| *G05B 19/18* | (2006.01) |
| *G06K 19/06* | (2006.01) |
| *G06T 19/00* | (2011.01) |
| *G06V 20/20* | (2022.01) |

(52) U.S. Cl.
CPC ........... *G02B 27/017* (2013.01); *G05B 19/18* (2013.01); *G06K 19/06009* (2013.01); *G06T 19/006* (2013.01); *G06V 20/20* (2022.01); *G05B 2219/39451* (2013.01)

(58) Field of Classification Search
CPC .................. G02B 27/017; G05B 19/18; G05B 2219/39451; G05B 2219/40323; G06K 19/06009; G06T 19/006; G06V 20/20
See application file for complete search history.

(56) References Cited

U.S. PATENT DOCUMENTS

| | | | |
|---|---|---|---|
| 9,821,548 | B2 | 11/2017 | Rieck |
| 9,868,211 | B2 | 1/2018 | Williams et al. |
| 9,880,553 | B1* | 1/2018 | Hoffmann ............ H04N 13/204 |
| 9,916,506 | B1 | 3/2018 | Davis |
| 10,209,080 | B2 | 2/2019 | Lindhé et al. |
| 10,360,531 | B1* | 7/2019 | Stallman .............. G06Q 10/087 |
| 11,010,975 | B1* | 5/2021 | Doptis ................. A63F 13/803 |
| 11,413,755 | B2 | 8/2022 | Smith |
| 2002/0158921 | A1 | 10/2002 | Silverstein |
| 2005/0269817 | A1 | 12/2005 | Alasia et al. |
| 2006/0066564 | A1 | 3/2006 | Yee et al. |
| 2007/0135962 | A1 | 6/2007 | Kawabe et al. |
| 2011/0196563 | A1 | 8/2011 | Yturralde et al. |
| 2012/0197439 | A1* | 8/2012 | Wang .................... B25J 9/1664 901/1 |
| 2013/0106833 | A1 | 5/2013 | Fun |
| 2013/0325244 | A1 | 12/2013 | Wang et al. |
| 2014/0025443 | A1 | 1/2014 | Onischuk |
| 2014/0100693 | A1 | 4/2014 | Fong et al. |
| 2015/0220814 | A1 | 8/2015 | Verkasalo et al. |
| 2015/0379459 | A1 | 12/2015 | Russell et al. |
| 2016/0239952 | A1 | 8/2016 | Tanaka |
| 2017/0123761 | A1 | 5/2017 | Childs et al. |
| 2017/0249745 | A1* | 8/2017 | Fiala ......................... G06T 7/13 |
| 2017/0361466 | A1* | 12/2017 | Anderson .............. B25J 9/1697 |
| 2018/0215043 | A1 | 8/2018 | Michalakis |
| 2018/0231973 | A1* | 8/2018 | Mattingly ............... G06F 3/012 |
| 2019/0080170 | A1 | 3/2019 | Baca et al. |
| 2019/0146518 | A1 | 5/2019 | Deng et al. |
| 2019/0198161 | A1* | 6/2019 | Lee ......................... G16H 40/63 |
| 2019/0202057 | A1* | 7/2019 | Smith ............... G06K 19/0614 |
| 2019/0224852 | A1 | 7/2019 | Choi et al. |
| 2019/0344444 | A1* | 11/2019 | Morra ................... B25J 9/1692 |
| 2019/0377330 | A1* | 12/2019 | Shors ................... G06V 30/224 |
| 2020/0342521 | A1* | 10/2020 | Tang ................. G06Q 30/0643 |
| 2021/0046655 | A1* | 2/2021 | Deyle .................... B25J 9/1664 |
| 2021/0086370 | A1* | 3/2021 | Zhang ................... B25J 9/0084 |
| 2021/0209364 | A1* | 7/2021 | Park ...................... G06T 19/006 |
| 2021/0323146 | A1* | 10/2021 | Hayashi ................ B25J 9/1605 |
| 2021/0338337 | A1* | 11/2021 | Calloway ................. G06T 7/20 |
| 2021/0383551 | A1* | 12/2021 | Fiala ..................... G06V 20/20 |

FOREIGN PATENT DOCUMENTS

| | | | |
|---|---|---|---|
| JP | 2005-515479 | A | 5/2005 |
| JP | 2007-233533 | A | 9/2007 |
| JP | 2007-257226 | A | 10/2007 |
| JP | 2007-319989 | A | 12/2007 |
| JP | 2008-264901 | A | 11/2008 |
| JP | 2009-023740 | A | 2/2009 |
| JP | 2010-176203 | A | 8/2010 |
| JP | 2012-145559 | A | 8/2012 |
| JP | 2013-025351 | A | 2/2013 |
| JP | 2015-225014 | A | 12/2015 |
| JP | 2016-201095 | A | 1/2016 |
| JP | 2017-501473 | A | 1/2017 |
| JP | 2017-113553 | A | 6/2017 |
| JP | 2017-527457 | A | 9/2017 |
| JP | 2017-204062 | A | 11/2017 |
| JP | 2019-121393 | A | 7/2019 |
| JP | 2019-205111 | A | 11/2019 |
| KR | 10-2017-0009103 | A | 1/2017 |
| WO | WO 92/20748 | A1 | 11/1992 |
| WO | WO 2002/023297 | A1 | 3/2002 |
| WO | WO 2002/088921 | A2 | 11/2002 |
| WO | WO 2015/090397 | A1 | 6/2015 |
| WO | WO 2016/122413 | A1 | 8/2016 |
| WO | WO 2017/123761 | A1 | 7/2017 |
| WO | WO 2019/209878 | A1 | 10/2019 |

OTHER PUBLICATIONS

Zhao et al., Magic Cards: A Paper Tag Interface for Implicit Robot Control, Proceedings of the 27th International Conference on Human Factors in Computing Systems, CHI 2009, Apr. 6, 2009, 10 pages, Association for Computing Machinery, New York, New York.
International Search Report for International Application No. PCT/US2021/040578 dated Oct. 26, 2021, 17 pages.

* cited by examiner

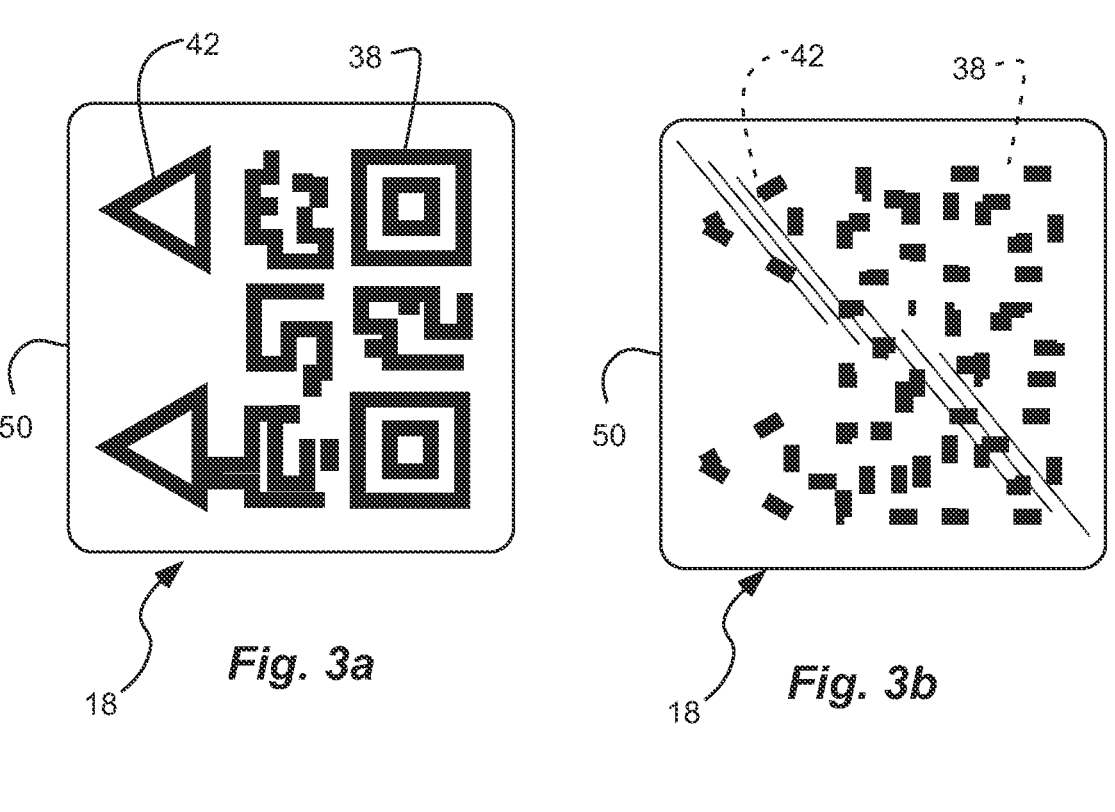
Fig. 3a
Fig. 3b
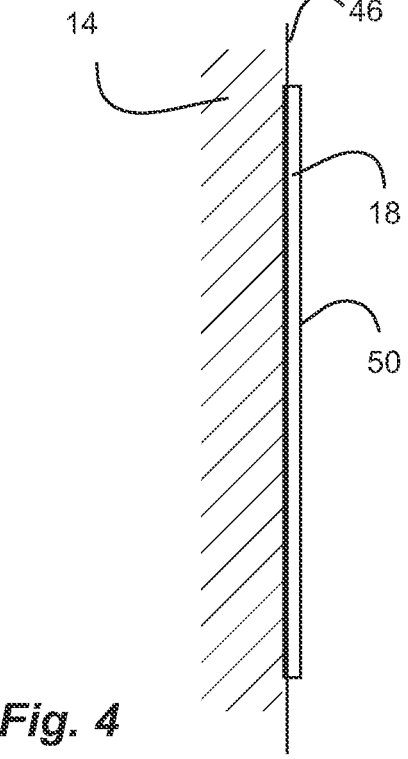
Fig. 4
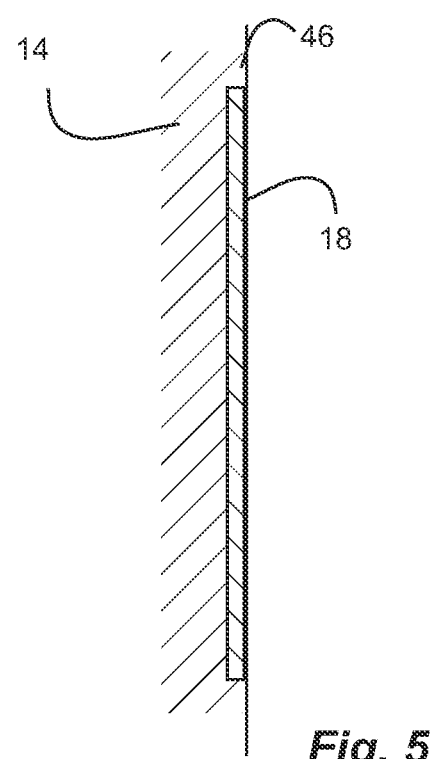
Fig. 5

AUGMENTED REALITY SYSTEM AND METHOD FOR CONVEYING TO A HUMAN OPERATOR INFORMATION ASSOCIATED WITH HUMAN-IMPERCEPTIBLE INDICIA WITHIN AN OPERATING ENVIRONMENT OF A ROBOT

RELATED APPLICATIONS

This application claims the benefit of U.S. Provisional Patent Application 63/048,123, filed Jul. 4, 2020, and entitled, "Augmented Reality System and Method for Conveying To a Human Operator Information Associated With Human-Imperceptible Indicia within an Operating Environment of a Robot," which is incorporated by reference herein in its entirety.

BACKGROUND

Having a robot traverse a space and interact with objects can be a difficult task. The robot must be able to distinguish obstacles which could damage the robot, or which can be damaged by the robot. In addition, the robot must be able to identify objects with which it must interact in order to carry out a task and/or follow instructions. Furthermore, some objects can present dangers or difficulties to interaction, such as the difference between a freezer and a refrigerator door, or which knob on a stove corresponds to which burner, and others.

In some operating scenarios, an autonomous robot can operate within an operating environment. In other operating scenarios, control of the robot or robotic device can be performed at least in part by a human operator, such with a remote control device, with a tele-operated control system (e.g., a master/slave system), or a combination of these. This is typically done where it is desired to maintain at least some control over the movements of the robot rather than the robot being fully autonomous. Within these operating scenarios, there may be instances where the human operator is located in a remote location from the robot where direct, real-world viewing of the operating environment (the environment in which the robot resides and is operating) by the human operator is not possible or desired. In these cases, a human operator can utilize an augmented reality system as part of an augmented reality platform, operable with the robot, where the human operator is able to view the operating environment in which the robot resides using an electronic display (e.g., a headset, one or more screens, etc.). The electronic display can be electronically connected or interfaced with the robot to receive sensed information (e.g., still or video images from one or more cameras on the robot), and/or sensed information directly from a sensor within the operating environment (e.g., one or more cameras mounted or otherwise present within the operating environment). The augmented reality system facilitates remote, electronically transmitted real-world human operator viewing of the operating environment and any desired control over the robot within the operating environment without the operator being physically present within the operating environment. The augmented reality system can be employed to oversee an autonomous robot operating in a remote environment, or to facilitate at least partial human operator control (i.e., tele-operated control or operation) of the robot in the remote environment, depending upon the type of robot and/or the level of human control to be associated with the robot.

While augmented reality systems can provide certain advantages when a robot is being remotely operated (tele-operated), there are conditions where at least partial human operator control of the robot or fully autonomous operation of the robot (with a human operator performing oversight) within the operating environment falls short of needed or desired performance, namely because some conventional augmented reality systems are incapable of conveying enough information to the human operator to overcome some, if not all, of the performance deficiencies that can be caused by inherent difficulties associated with one or more of the objects within the operating environment. For example, a fully autonomous robot may not be able to adequately perform certain tasks, or interact with one or more objects within the operating environment as a result of inadequate programming, complexity of the task or interaction requirements, or for other reasons. In another example, a robot that is at least partially controlled by a human operator may encounter certain tasks, or may be required to interact with one or more objects, that the human operator is unfamiliar with, or that are complex in nature, or that for any other reason prohibit or limit the ability of the human operator to complete the task(s) or interact with the object. In these situations, the human operator using some of the conventional augmented reality systems will likely be unable to enhance the performance of the robot simply by being able to view the real-world view of the operating environment due to the limits of the information conveyed to the human operator through the augmented reality system.

Of course, some augmented reality systems utilize object recognition or other machine learning methodologies to try and teach the robot how to interact with certain objects, and then convey associated information to human operators in the form of computer generated imagery based on the results of the object recognition process, but these methodologies can be extremely costly and can employ complex algorithms that may be insufficient for interaction with some objects within an operating environment, such as those that are more complex or difficult for a robot to interact with.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3a is a schematic front view of a machine-readable, but human-imperceptible, label or indicia for marking an object of FIG. 2 in accordance with an example, and shown visible for the sake of clarity.

FIG. 3b is a schematic front view of the label or indicia for marking an object of FIG. 2 in accordance with an example, and illustrated in such a way to indicate invisibility.

FIG. 4 is a schematic side view of the label or indicia for marking an object of FIG. 2 in accordance with an example.

FIG. 5 is a schematic cross-sectional side view of the label or indicia for marking an object of FIG. 2 in accordance with an example.

Figure 1:
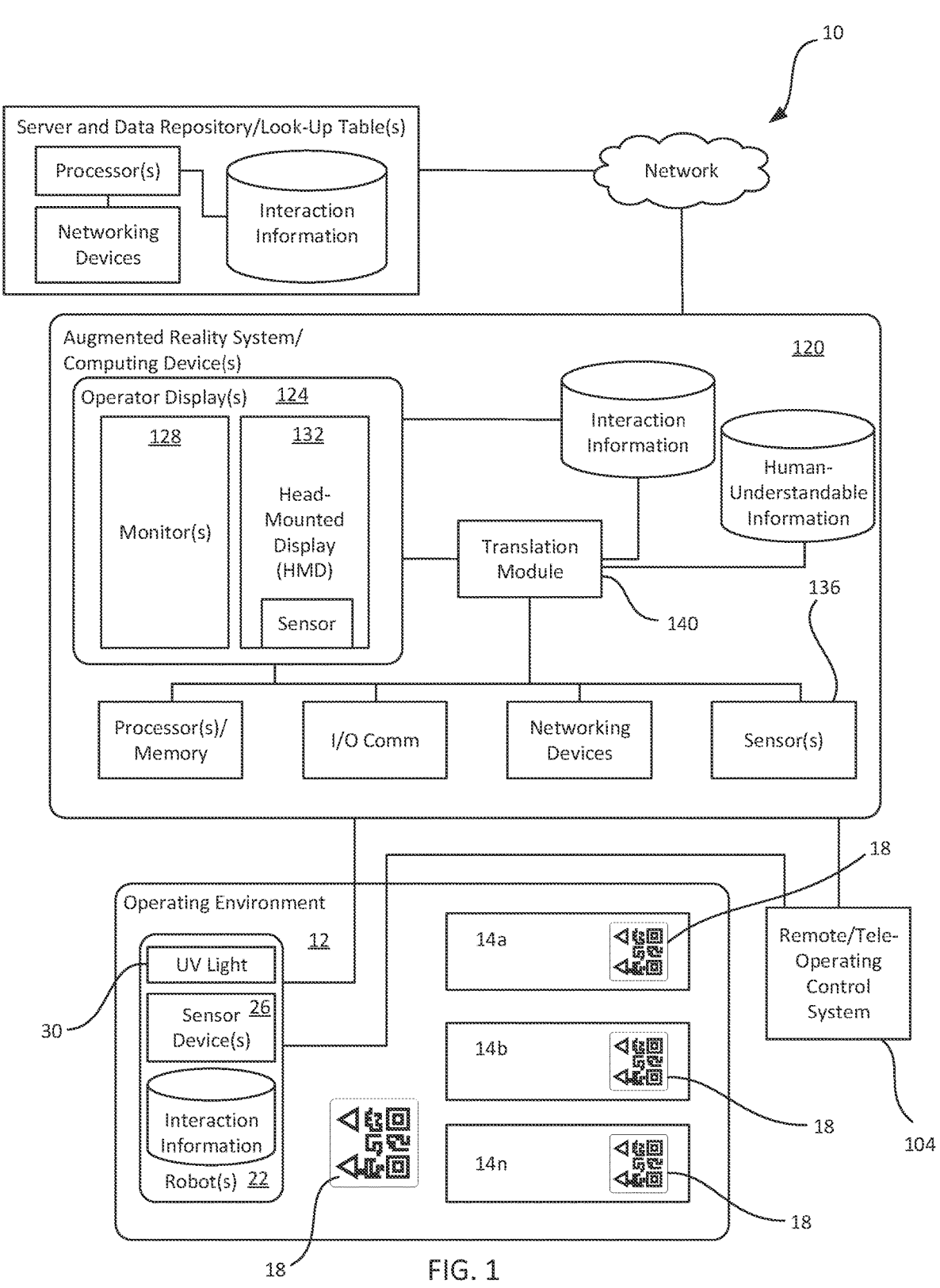
FIG. 1 is a schematic block diagram of robotic system comprising an augmented reality system in accordance with an example.

Reference will now be made to the exemplary embodiments illustrated, and specific language will be used herein to describe the same. It will nevertheless be understood that no limitation of the scope of the invention is thereby intended.

SUMMARY OF THE INVENTION

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The present disclosure sets forth a robotic system comprising a robot; human-imperceptible indicia associated with an object within an environment in which the robot operates, the human-imperceptible indicia facilitating access to interaction information; at least one sensor operable to sense the human-imperceptible indicia and the interaction information; an augmented reality system comprising a computer, the augmented reality system in communication with the robot, and operable to convey human-understandable information corresponding to or otherwise associated with the interaction information to a human operator; and interaction information stored in a database, the interaction information being associated with the linking information and pertaining to a predetermined intended interaction of the robot with the object, the interaction information being operable to facilitate interaction with the object by the robot in accordance with the predetermined intended interaction.

In one example, the augmented reality system can further comprise a translation module operable to translate the interaction information into the human-understandable information, and to transmit the human-understandable information to the operator.

The present disclosure also sets forth a robotic system comprising a robot; human-imperceptible indicia associated with an object within an environment in which the robot operates, the human-imperceptible indicia comprising interaction information directly thereon pertaining to a predetermined intended interaction of the robot with the object, the interaction information being operable to facilitate interaction with the object by the robot in accordance with the predetermined intended interaction; at least one sensor operable to sense the human-imperceptible indicia and the interaction information; and an augmented reality system comprising a computer, the augmented reality system in communication with the robot, and operable to convey human-understandable information corresponding to or otherwise associated with the interaction information to a human operator.

In one example, the robot can comprise a camera, and the augmented reality system can further comprise a visual display viewable by a human operator, the augmented reality system being operable to display, at least in part, an electronically transmitted real-world view of the operating environment on the visual display as captured by the camera. The robot can utilize the camera to transmit the real-world view of the operating environment to the augmented reality system that can be combined with the human-understandable information to provide augmented reality operation of the robot.

The present disclosure further sets forth a method for deploying a robot, as part of an augmented reality platform, within a machine navigable environment, the method comprising identifying a desired space in which the robot will operate; selecting one or more objects that are or will be located in the space; marking the one or more objects with human-imperceptible indicia being machine-readable, the human-imperceptible indicia comprising at least one of interaction information or linking information that links to a database comprising interaction information; introducing the robot into the space, the robot being capable of movement within the space; operating an augmented reality system in communication with the robot, the augmented reality system comprising a computer, and operable to convey human-understandable information to a human operator, the human-understandable information corresponding to or otherwise being associated with at least one of the interaction information or the linking information; sensing the human-imperceptible indicia; conveying the human-understandable information to a human operator; and facilitating interaction with the one or more objects by the robot in accordance with the human-understandable information.

The system and method can comprise marking or identifying an object to be perceptible (i.e., machine-readable) to a robot or the augmented reality system, while being invisible or substantially invisible to humans. Such marking can facilitate identification, interaction and navigation by the robot, or a human operator overseeing or at least partially operating the robot using the augmented reality system and human-readable interaction instructions as conveyed to the human operator through the augmented reality system. The markings can create a machine or robot navigable environment (an operating environment) for the robot, whether autonomously operated, or operated at least in part by the human operator (such as via a tele-operated control system operable with the augmented reality system to facilitate at least partial control of the robot). By way of example, such an object can be an appliance, such as a refrigerator, with which the robot approaches and interacts in order to complete a task, such as to retrieve an item (e.g., a beverage). Thus, the appliance or refrigerator can have a marking, label, tag (i.e., indicia) that is machine-readable, and that can identify the appliance as a refrigerator, and thus the object with which the machine or robot will interact to retrieve the item, as well as that can provide information about the refrigerator, such as how to interact with it, its status, and any other information relevant to and pertaining to the refrigerator or how the robot can interact with the refrigerator. Obviously an operating environment containing an appliance is not intended to be limiting in any way as a robot can be placed within any operating environment in which there are other types of objects. Such environments and associated objects can be dangerous or impractical for humans, such as a hostile operating environment with hostile objects, a hazardous operating environment with hazardous objects, and others. As used herein, the term "indicia" refers to one or more than one "indicium" that is associated with an object or otherwise present within the operating environment. The indicia can be contained in or on a tag or other marker placed on the object, printed or otherwise attached to or associated with the object, supported on a structure within the operating environment, etc. The indicia can include various information, such as information that identifies the parts of the object, such as the handle of the refrigerator, again with which the robot will interact. Multiple different markings, labels, tags or other indicia can be used to distinguish the multiple different parts of the object. In keeping with the refrigerator example, this can include the refrigerator handle, the freezer handle, the ice maker dispenser, the water dispenser, different shelves or bins, etc. Furthermore, the indicia can also indicate information pertaining to a status of an object or objects, direction (travel direction), magnitude, operating or other interaction instructions, information related to or ancillary to the object, or any other information or parameters that may be useful in terms of how the robot should or could interact with the object, whether operating autonomously, or being operated at least in part by a human operator, such as via a tele-operated control system and the augmented reality system. Using the example of the refrigerator, the indicia can indicate which direction the door opens, how much force should be exerted to open the door, the degree of rotation to be carried out, instructions regarding removing items or moving items to a different location within the refrigerator, the make/model of the refrigerator, how long the refrigerator has been in use, instructions for repair or maintenance, and any other associated information.

The machine readable indicia can comprise symbols, codes, wording, etc. that can be perceived and interpreted by the robot or the augmented reality system, but that are not visible to the unaided human eye. In one example, the robot or the augmented reality system can utilize a camera with an image sensor to see the indicia. In addition, the indicia can be invisible or substantially invisible to the unaided human eye so that such indicia does not create an unpleasant environment for humans, and remains aesthetically pleasing to humans. For example, the indicia can reflect UV light, while the image sensor can be capable of detecting such UV light. Thus, the indicia can be perceived by the robot or the augmented reality system, while not interfering with the aesthetics of the environment.

The machine readable indicia associated with an object can comprise indicia carried by or on the object itself, where the indicia comprises all or a part of the information that facilitates identification and interaction with the object within the operating environment. In another example, the machine readable indicia associated with an object can comprise indicia carried by the object itself, where the indicia comprises linking information that facilitates a link to a database where interaction information pertaining to the object can be accessed by the robot, or by one or more computer systems as part of the augmented reality system that facilitates identification and interaction with the object within the operating environment.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "visible" refers to visible to the unaided human eye and visible with light in the visible spectrum, with a wavelength of approximately 400 to 750 nanometers.

As used herein, "indicia" refers to both indicia and indicium, unless specified otherwise.

Figure 2:
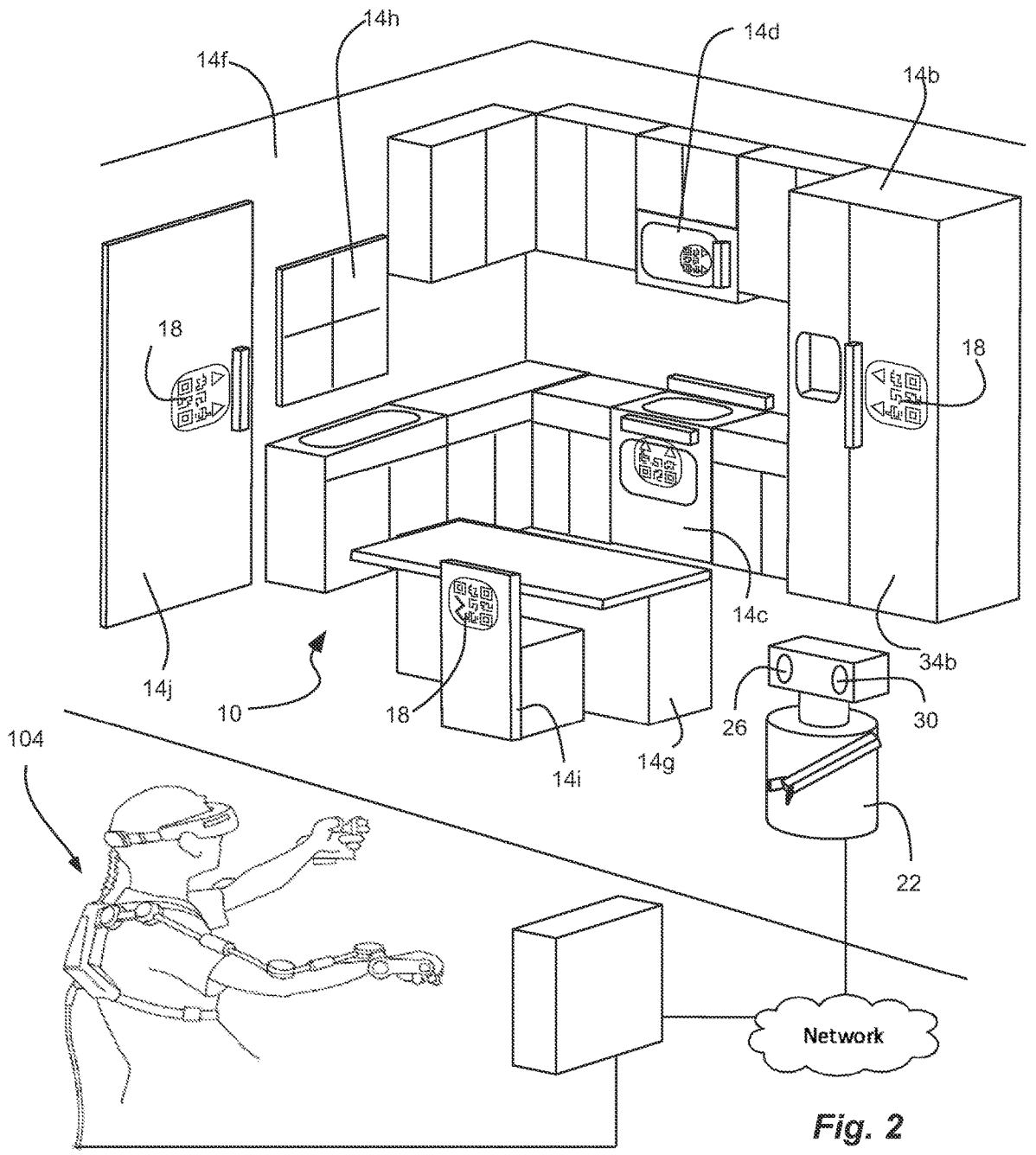
FIG. 2 is a schematic perspective view of a robotic system comprising an augmented reality system illustrating a tele-operated control system for a robot in the form of a wearable master control system, a human operator display in the form of a head-mounted display, and a space or operating environment with objects therein marked with machine-readable, but human-imperceptible, indicia, defining a machine-navigable environment through which a robot can navigate and interact, in accordance with an example.

FIG. 1 illustrates a schematic block diagram of a robotic system in accordance with an example of the present disclosure. FIG. 2 illustrates a schematic perspective view of what a specific robotic system 10 representative of the robotic system of FIG. 1 may comprise. With reference to FIGS. 1 and 2, the robotic system 10 can comprise a robot 22 configured to navigate and interact within a space 12 within an operating environment, the space 12 having any number of exemplary objects (e.g., objects 14a-14n, with "n" representing any number) (e.g., see specifically objects 14a-j in FIG. 2) marked with machine-readable, but human-imperceptible, indicia 18, therein, defining a machine-navigable operating environment through which the robot 22 can navigate and interact, in accordance with an example.

The robot 22 can be mobile and self-propelled, such as with power-actuated joints, a propulsion system (e.g., wheels and a motor) and other components and systems. The robot 22 can comprise any type of robot, such as a tele-operated robot, a humanoid robot, or any other as understood by those of skill in the art. The robot 22 can have one or more arms with one or more end effectors in the form of grippers or fingers, or the like, for grasping or engaging objects. The robot 22 can comprise one or more sensors or sensor devices 26, including a camera. In one example, the robot 22 can be at least partially tele-operated by a human operator. Indeed, the robotic system 10 can further comprise a remote or tele-operated control system 104 (e.g., a master control system) in communication with the robot 22, such as via network, wherein the tele-operated control system 104 provides the human operator with the ability to control, to at least some extent, movements, locomotion, sensor deployment and other functions of the robot 22. This can be done in close proximity to the robot 22, or from a remote location. In one example, the tele-operated control system 104 can comprise a wearable master control system comprising an exoskeleton that can be donned by the human operator (e.g., see FIG. 2). The tele-operated control system 104 can comprise various sensors, communications components/capabilities, and any other components or systems supported thereon (see FIG. 2) designed and configured to facilitate at least partial remote operation (tele-operation) of the robot 22.

The robotic system 10 can further comprise at least one sensor operable to sense the human-imperceptible indicia, including any identification or interaction (including linking) information carried or supported on the one or more objects 14. In one example, the sensor can comprise the camera 26 with an image sensor as supported on the robot 22, wherein the image sensor is operable to view or sense objects and the environment. In one aspect, the camera 26 or image sensor can be operable in the UV spectrum, and can be capable or viewing or sensing UV light. In addition, the robot 22 can have a UV light source 30 capable of emitting UV light to illuminate and reflect off of the objects and environment. In one aspect, the UV light source 30 can emit, and the UV camera 26 or image sensor thereof can detect, near UV light (NUV) with a wavelength between 200 to 380 nanometers.

The robotic system 10 can further comprise an augmented reality system 120 in communication with the robot 22, or the tele-operated control system 104, or both of these. The augmented reality system 120 can be operable to convey (e.g., display) to an operator operating all or part of the robotic system 10 an electronically transmitted real-world view of at least a portion of the space 12 of the operating environment. The real-world view can be generated from still or video images captured by the camera 26 or other sensors of the robot 22. The augmented reality system 120 can further be operable to convey human-understandable information, to the human operator of the robotic system 10. "Human-understandable information" refers to information that a human understands and that corresponds to certain types or forms of one or more indicia 18 and/or interaction information associated with the indicia 18, which cannot initially be perceived by a human, such as because the one or more indicia are machine readable. As is discussed below, some indicia 18 can comprise human-understandable information that can be directly conveyed to the human operator, while some indicia 18 can comprise, or facilitate access to, at least one of machine readable interaction information that must be translated into human-understandable information prior to conveying it to the human operator in order to be understood by the human operator. The robot 22 can utilize a camera 26 or other sensor to transmit the real-world view of the operating environment to the augmented reality system 120 that can be combined with the human-understandable information to provide augmented reality operation of the robot 22.

The augmented reality system 120 can comprise a computer having all of the necessary processors, memory, I/O communication devices needed to facilitate the augmented reality. The augmented reality system 120 can further comprise one or more operator or visual displays 124, in connection with the computer, the visual display 124 being viewable by the human operator, wherein the augmented reality system 120 can display, at least in part, the electronically transmitted real-world view of the space 12 and any human-understandable information. The one or more displays 124 can comprise one or more screens or monitors 128, a head-mounted display (HMD) 132, or any other type of display viewable by the human operator or any combination of these. The augmented reality system 120 can further comprise audible or haptic devices, such as sensors and transmission devices, which allow the human operator to receive human-understandable information in the form of audible sounds or haptic feedback.

The augmented reality system 120 can be connected to the tele-operated control system 104, thus allowing the human operator to at least partially control the robot 22 using augmented reality, including using any conveyed human-understandable information, as will be discussed in more detail below.

In one example, the image sensor(s) 136 operable to sense the human-imperceptible indicia, including any interaction, or linking or other information, can be supported within the augmented reality system 120 such as on at least one of the computer or the head-mounted display 132 of the augmented reality system 120. The image sensor 136 can be in communication with the sensor device(s) 26 (e.g., camera) on the robot 22, which can be configured to transmit image data (e.g., still or video image data) to the image sensor 136 as acquired by the camera 26 from within the space 12 of the operating environment. In another example, the image sensor 136 operable to sense the human-imperceptible indicia can be supported on the robot 22 (e.g., the sensor can comprise the camera 26 and a suitable image sensor), as discussed above. In either scenario, the augmented reality system 120 can be configured to display the indicia 18, or the information provided or facilitated by (e.g., linked to) the indicia 18, to the human operator in the form of human-understandable information, which, in one example, can be information that pertains to a predetermined intended interaction of the robot with the one or more objects 14. However, this is not intended to be limiting in any way as the human-understandable information can comprise any information for any purpose, such as that designed to assist the operator in operating the robotic system. Indeed, the human operator can utilize the human-understandable information obtained or derived from the human-imperceptible indicia 18 and conveyed in augmented reality to the human operator for a variety of reasons, such as to more efficiently and/or expertly operate the robot 22 as it is caused to interact with the one or more objects within the space 12, to supervise or oversee and verify proper operation of the robot 22, for training of the robot 22, and others. In the example where the robot 22 comprises an autonomous robot, the augmented reality system 120 can enable a human operator to oversee the movements of the robot 22 and how the robot 22 interacts with the objects within the space 12 by being able to view the human-understandable information that is associated with the indicia 18, which indicia 18 is associated with the objects 14 within the space 12. This information can be used to make various corrections in the robotic system as needed. In the example where the robot 22 is at least partially operated or controlled by a human operator, such as via a master control system, the augmented reality system 120 can enable the human operator to control one or more movements of the robot 22 as it interacts with the objects 14 within the space 12 by viewing the human-understandable information associated with the one or more indicia associated with the objects 14 within the space 12. With the human-understandable information being conveyed to the human operator from the image sensor 136 sensing the indicia 18, the human operator can carry out instructions related to interacting with the object(s) 14, note status or other parameters of the objects(s) 14, perform maintenance or other functions on the object(s) 14, manipulate the object(s) 14 in a directed way, and/or perform any other function or task that can be made possible or more efficient with the human-understandable information. In addition, safety can be enhanced as the human operator is better equipped to interact with the object(s) 14 in an intended manner. Moreover, as mentioned, training of the robot 22 can be facilitated by the augmented reality system 120 as the robot 22 learns how to interact with objects in a more efficient manner.

As the one or more indicia 18 on the object(s) 14 is human-imperceptible (not viewable by a human in the visible spectrum), the augmented reality system 120 can be connected to the sensor 136 and the robot 22 to facilitate receipt of the information associated with the indicia 18 and conveyance of such information to the human operator. In one example, the indicia 18 can comprise information that would otherwise be readable by the human operator were the indicia 18 viewable in the viewable spectrum. In other words, the indicia 18 can comprise human-understandable information that the augmented reality system can directly convey to the human operator, such as via the operator display(s), upon the sensor that is operable with the augmented reality system sensing (e.g., machine reading) the indicia 18.

In another example, the indicia 18 can comprise interaction information (including any linking information) that can be sensed by the sensor 136 (i.e. machine read), but that must be translated into human-understandable information that can be displayed to the human operator. As such, the augmented reality system 120 can further comprise a translation module or translation system 140 operable to translate the interaction information (including any linking information) associated with the indicia 18 into human-understandable information, and to transmit or convey the now human-understandable information to the human operator, such as via the operator display(s) 124 or an audible or haptic device. The translation module 140 can comprise translation software comprising one or more translation algorithms that are able to facilitate the translation of the interaction information into the human-understandable information. For example, the human-imperceptible indicia 18 can comprise machine-readable indicia, such as a quick-response or QR code, containing or associated with certain interaction information and/or linking information, and the computer of the augmented reality system 120 can be programmed, using the translation software executing a suitable translation algorithm (e.g., a QR code algorithm), to effectuate or carry out the translation of such interaction information into human-understandable information. This translation can comprise accessing a database of preprogrammed user-understandable information linked with, mapped to, or otherwise associated with the interaction information on the indicia 18. For example, the translation module 140 can execute the translation algorithm, part of which can include instructions to access a database of human-understandable information that is linked with or mapped to or otherwise associated with the interaction information on the indicia 18 sensed or machine read by the image sensor. Once retrieved, the information can be conveyed (i.e., transmitted) to the operator in conjunction with the real-world view made viewable to the operator by the augmented reality system. The human-understandable information can be different from the information that the robot 22 may utilize upon sensing the indicia 18 and reading the interaction information. For example, as discussed herein, the robot 22 can receive interaction information in the form of computerized instructions or other information executable by the robot 22 in terms of how the robot 22 is to interact with the object upon which the indicium or indicia 18 is supported, such as the amount of force to use, the types and degree of movements to make (e.g. the degrees of rotation of one or more joints to undergo), etc. On the other hand, the translation module 140 can facilitate translation of the interaction information into human-understandable information that is essentially equivalent in terms of how the robot 22 is to perform and/or what the robot 22 is to do as it pertains to interacting with the object(s) in support of the indicia 18, but that an operator can understand so as to effectuate the same or more efficient interaction of the robot 22 with the object. In other words, the human-understandable information translated by the translation module 140 and conveyed to the operator will likely be more high-level information due to a human's ability to process complex tasks from simple instructions (e.g., go to and open the refrigerator door and retrieve a soda type of drink from the top shelf). The indicia 18 themselves can comprise an identifier in addition to the interaction information (including any linking information). The indicia identifiers, the interaction information, or a combination of these, can be linked or otherwise associated with human-understandable information stored in a database and properly mapped, such that the appropriate human-understandable information can be retrieved and conveyed to the operator upon a specific indicium or indicia being machine read by the image sensor 136. The human-understandable information can comprise as much detailed information as needed or desired that relates to the object or interaction with the object that the operator would need to be informed sufficiently as to the purpose of and function of that particular indicium or indicia 18, to assist the robot 22 with interaction with or otherwise performing a function related to the object, or to carry out a task associated with the object. It is noted that the operator display(s) 124 or other devices (e.g., HMD 132 or monitor(s) 128) can receive the human-understandable information from the robot 22 or from the computer of the augmented reality system 120, depending upon the location of the sensor 136.

The augmented reality system 120 can be configured to display on the operator display(s) 124 (e.g., the HMD 132 or one or more screens/monitors 128) the human-understandable information in addition to, and/or in synchronization with, the electronically transmitted real-world view. As such, the augmented reality system 120 can link the human-understandable information to the indicia 18 from which it is derived to properly and timely convey (i.e., electronically transmit) the human-understandable information to the operator (specifically to a display viewable by the operator) upon the indicia 18 being sensed by the image sensor(s) 136 (and translated if need be). In one example, the human-understandable information can be in the form of computer-generated imagery (e.g., text, pictures, and other graphics) superimposed over the electronically transmitted real-world view viewable by the operator. In another example, the human-understandable information can comprise audible or haptic messages conveyed to the operator, which messages can be linked to the indicia from which they are derived, and conveyed in association with the real-world view viewable by the operator. The computer-generated imagery can be representative of at least some of the interaction or other information associated with the indicia 18 as obtained by the sensor 136 sensing the one or more indicia 18 on the one or more objects 14 within the space 12.

There are several recognized advantages of the augmented reality system discussed herein. One such advantage is that the robot can be caused to perform complex tasks and other functions within the operating environment that it may not be able to otherwise perform. Utilizing the interaction information associated with the indicia 18 present within the operating environment, and conveying (i.e., transmitting) this to an operator in the form of human-understandable information can overcome some, if not all, of the performance deficiencies that can be caused by inherent difficulties associated with one or more of the objects within the operating environment. For example, a partial or fully autonomous robot that otherwise may not be able to adequately perform certain tasks, or interact with one or more objects within the operating environment as a result of inadequate programming, complexity of the task or interaction requirements, or for other reasons, can now receive assistance from the operator utilizing the augmented reality system and the human-understandable information to perform the task, or interact appropriately and more efficiently with the object due to the interaction information associated with the indicia 18 within the operating environment being conveyed to the operator in the form of human-understandable information. In another example, a robot that is at least partially controlled by a human operator and that may encounter certain tasks, or that may be required to interact with one or more objects, that the human operator is unfamiliar with, or that are complex in nature, or that for any other reason may otherwise prohibit or limit the ability of the human operator to complete the task(s) or interact with the object, can be made more functional and capable due to the interaction information associated with the indicia in the operating environment being conveyed to the operator in the form of human-understandable information as provided by the augmented reality system. With the augmented reality system disclosed herein, the human operator will be able to enhance the performance of the robot by being able to view the real-world view of the operating environment in conjunction with the human-understandable information that is derived from the indicia and the interaction information associated with the indicia, and that is conveyed to the operator through the augmented reality system.

Another advantage is that the augmented reality system discussed herein provides a much more efficient, effective and economical alternative to conventional augmented reality systems that utilize object recognition or other machine learning methodologies to try and teach the robot how to interact with certain objects, and then convey associated information to human operators in the form of computer generated imagery based on the results of the object recognition process, which methodologies can be extremely costly and can employ complex algorithms that may be insufficient for interaction with some objects within an operating environment, such as those that are more complex or difficult for a robot to interact with.

The objects (e.g., objects 14a, 14b, and 14c) can vary depending upon the operating environment or space 12. In one aspect, the environment or space 12 can be a home or kitchen therein. Thus, the objects can comprise built-in appliances, such as a refrigerator 14b, a range 14c or stove and cooktop, a microwave oven 14d, a dishwasher, a trash compactor, etc. In another aspect, the objects can comprise countertop appliances, such as a blender, a rice-cooker, a vegetable steamer, a crockpot, a pressure cooker, etc. In addition, the objects can have an interface, such as a handle, knob, button, actuator, etc. In addition, the objects can be or can represent a physical boundary or barrier to movement or action of the robot 22, such as walls 14f, counters or islands 14g, etc. In addition, the objects can be or can represent a physical boundary or barrier subject to damage of the object by the robot 22, such as an outdoor window 14h, an oven window, a microwave window, a mirror, a glass door of a cabinet, etc. In addition, the objects can be or can represent a physical boundary or barrier hazardous to the robot 22, such as stairs, machinery, etc. Furthermore, the objects can be or can represent a physical boundary or barrier subject to frequent movement, such as a chair 14i, a door 14j, etc. The objects can have exterior, outfacing surfaces, represented by 34b of the refrigerator 14b, that face outwardly and into the space 12. The space 12 can comprise any type of space, such as within a commercial, government, or residential structure, any type of space within an indoor or outdoor setting, and the objects can comprise any type of objects. As such, those specifically identified and discussed herein are not intended to be limiting in any way.

The indicia 18 can be disposed on and carried by the object 14, such as on the exterior, outfacing surface, etc. In one aspect, the indicia 18 can comprise information pertaining to the object, to the interaction of the robot with the object, the environment, etc. For example, the indicia can 18 can identify the object, a location of an interface of the object, indicate the physical boundary or barrier thereof, indicate the position of the indicia within a series of indicia that comprise or that are associated with a sequence of tasks, or can comprise certain interaction information directly thereon, or that comprises database-related or linking information that facilitates access to such interaction information, such as by providing a link, opening or causing to be opened, or other access initiating indicia to a computer database comprising the information, wherein the robot 22, or an operator through the augmented reality system, can interact with the computer database to obtain the information designed to assist the robot 22 in how to interact with the object, its environment, etc. This is explained in further detail below.

The phrase "interaction information," as used herein, can mean information conveyed to or retrievable (e.g., through database-related or linking information that facilitates access to such interaction information, such as by providing a link, opening or causing to be opened, or other access initiating indicia to a computer database comprising the information) by the robot 22 or the augmented reality system 120 facilitated by reading of the marking indicia 18 that can be needed by or useful to the robot 22 to interact with an object in one or more ways, wherein the interaction information facilitates efficient, accurate and useful interaction with the object by the robot 22. More specifically, the interaction information can comprise information that pertains to a predetermined intended interaction of the robot 22 with an object, and any other type of information readily apparent to those skilled in the art upon reading the present disclosure that could be useful in carrying out predetermined and intended robot interaction with the object in one or more ways. Interaction information can comprise, but is not limited to, information pertaining to the identification of the object (e.g., what the object is, the make or model of the object, etc.), information about the properties of the object (e.g., information about the material makeup, size, shape, configuration, orientation, weight, component parts, surface properties, material properties, etc. of the object), computer readable instructions regarding specific ways the robot can manipulate the object, or a component part or element of the object (e.g., task-based instructions or algorithms relating to the object and how it can be interacted with (e.g., if this task, then these instructions), information pertaining to the status of the object, information pertaining to how the robot 22 can interact with the object (e.g., direction, magnitude, time duration, etc.), relative information as it pertains to the object (e.g., information about the object relative to its environment (e.g., distance from a wall, location where it is to be moved to, etc.) or one or more other objects, information about its location (e.g., coordinates based on GPS or other navigational information), etc.), information about tasks that utilize multiple marking indicia (e.g., sequence instructions that can include identification of the sequence, the position of each indicia within a series of indicia, what the next sequential marking indicia is and where to go to find the next sequential marking indicia, etc.). The nature, amount and detail of the interaction information can vary and can depend upon a variety of things, such as what the robot 22 already knows, how the robot 22 is operated, such as whether the robot 22 is intended to function autonomously, semi-autonomously, or under complete or partial control via the remote or tele-operation control system 104 (e.g., a master control system) in conjunction with the augmented reality system 120, etc. The interaction information described and identified herein is not intended to be limiting in any way. Indeed, those skilled in the art will recognize other interaction information that can be made available to the robot 22, or to the augmented reality system 120, where the interaction information is displayed in the form of human-understandable information, via the indicia. It is contemplated that such interaction information can be any that may be needed or desired for the robot 22, the human operator, or a combination of these to interact with any given object, and as such, not all possible scenarios can be identified and discussed herein. In one aspect, the indicia 18 can comprise interaction information (e.g., identification information, interaction instructions, etc.) in the form of machine language that is recognizable and understood by the robot 22 or computer processor thereof, or by the augmented reality system 120 or computer processor(s) thereof, and that facilitates interaction of the robot 22 with one or more objects within the space 12. In another aspect, the indicia 18 can comprise linking information (e.g., codes, numbers, etc.) in the form of machine language that is recognizable by the robot 22 or the augmented reality system 120, or computer processors thereof, wherein the linking information facilitates access (e.g., through a computer network) to a data repository containing the interaction information. The data repository can comprise a look-up table or library. Thus, the look-up table or library can comprise codes or numbers associated with interaction information. In one aspect, the data repository and the interaction information can be internal to the robot 22 or part of the augmented reality system 120. In another aspect, a server and data repository and the interaction information can be external to the robot 22 or the augmented reality system 120, and with which the robot 22 or the augmented reality system 120 can communicate during operation via a computer network or cloud-based system accessible by the robot 22 or the augmented reality system 120.

As indicated above, the space 12 and the operating environment can comprise any type in any location in which it may be desirable to operate one or more robots. In one example, the environment or space 12 can be an office. Thus, the objects can comprise walls, cubicles, desks, copiers, etc. In another example, the environment or space 12 can be an industrial or manufacturing warehouse, plant, shipyard, etc. Moreover, the objects can comprise products, machinery, or any other objects. Essentially, it is contemplated herein that the labels with indicia 18 can be utilized in any conceivable environment in which a robot could operate, and that they can be utilized on any objects or items or structural elements within such environments, and that they can comprise any type of information of or pertaining to the environment, the objects, the interaction of these with one another, etc.

FIG. 3*a* depicts a schematic front view of a marker in the form of a label comprising indicia 18 configured to be applied to an object in accordance with an example. As such, the marker can comprise a physical medium or carrier operable to support or carry thereon the marking indicia 18. For sake of clarity, the label with indicia 18 is shown as being visible, although such indicia 18 can be configured to be invisible to the unaided human eye (human-imperceptible) and substantially transparent to visible light. FIG. 3*b* depicts a schematic front view of the label and indicia 18 supported thereon, but illustrated in such a way to indicate invisibility to the unaided human eye, and substantial transparency to visible light. The indicia 18 is machine-readable. With reference to FIGS. 1-3*a*, thus, the indicia 18 can include symbols or patterns 38 or both that can be perceived by the sensor (e.g., the camera 26 or image sensor (or other sensor or detector) on the robot 22, or the sensor as supported within the augmented reality system 120), and recognized by the robot 22. In one aspect, the indicia 18 can be or can comprise a bar code that is linear or one-dimensional with a series of parallel lines with a variable thickness or spacing to provide a unique code, or a two-dimensional MaxiCode or QR code with a pattern of rectangular or square dots to provide a unique code, etc. In another aspect, the indicia can include symbols, letters, and even arrows 42 or the like. In another aspect, the indicia 18 can be passive, as opposed to an active identifier, such as a radio frequency identification (RFID) device or tag.

In addition, the indicia 18 can be human-imperceptible or invisible or substantially invisible to the unaided human eye, as indicated in FIG. 3*b*. In one aspect, the indicia 18 can be invisible in the visible spectrum, and thus does not substantially reflect visible light. In one aspect, the indicia 18 can be transparent or translucent, so that visible light substantially passes therethrough. In one aspect, the indicia 18 can be ultraviolet and can reflect ultraviolet light, either from the surrounding light sources, such as the sun, or as illuminated from the UV light source 30 of the robot 22. Thus, the indicia 18 can be visible in the UV spectrum. Therefore, the indicia 18 can be applied to an object and appear to the human eye as translucent or clear, or transparent to visible light, and thus can be substantially imperceptible to the unaided human eye to maintain the aesthetic appearance of the object. But the indicia 18 can be visible, such as in the UV spectrum, to the camera 26 of the robot 22 upon UV light being caused to be incident on the indicia 18.

The indicia 18 can be visible outside of the visual spectrum. In one aspect, the indicia 18 can fluoresce when exposed to light within certain spectrums (e.g., UV light), or be visible with infrared or IR (near, mid and/or far). For example, the object can be marked with indicia that is IR reflective and visible in the IR spectrum; and the robot can have a camera with an image sensor operable in the IR spectrum and an IR light source. In another aspect, the indicia 18 can be radio frequencies or sound in wavelengths outside of the human audible ranges. For example, the object can be marked with indicia that is RF reflective; and the robot can have a sensor operable in the RF spectrum. As another example, the robot can touch the object with an ultrasonic emitter and receive a characteristic return signal, or emit a sound that causes an internal mechanism to resonate at a given frequency providing identification. Thus, the object can be marked with indicia that emits ultrasonic wavelengths, and the robot 22 or the augmented reality system 120 can have a sensor operable in the ultrasonic spectrum. Again, the indicia 18 and/or the interaction information associated therewith can be translated or interpreted into human-understandable information by the augmented reality system 120 in order to be displayed to and understood by the human operator.

Referring again to FIGS. 1 and 2, the object 14, such as a window of the range 14*c*, or a window of the microwave 14*d*, or the outside window 14*h*, can have a transparent portion. The indicia 18 can be disposed on the transparent portion, and can be transparent, as described above, so that the indicia does not interfere with the operation of the object or transparent portion thereof. Thus, the indicia 18 applied to the window 14*h* or transparent portion of the range 14*c* or microwave 14*d* does not impede viewing through the window or transparent portion.

FIG. 4 depicts a schematic cross-sectional side view of the label with indicia 18 for marking an object 14. In one aspect, the indicia 18 can be disposed over a finished surface 46 of the object 14. In one aspect, the indicia 18 can be supported on a removable label or a removable applique 50 removably disposed on or applied to an outermost finished surface 46 of the object 14. For example the indicia 18 can be printed on the label or the applique 50. The applique 50 can adhere to the finished surface 46 of the object, such as with a releasable or permanent adhesive. Thus, the indicia 18 can be applied to the objects 14 in an existing space, and after manufacture and transportation of the objects to the space. The indicia 18 or labels 50 can be applied to an existing space and the objects therein.

FIG. 5 depicts a schematic cross-sectional side view of the label or indicia 18 for marking an object 14. In one aspect, the indicia 18 can be disposed under an outermost finished surface 46 of the object 14. For example, the indicia 18 can be disposed directly on the object, such as by printing or painting, and then the outermost finished surface 46, such as a clear coat or the like, can be applied over the indicia 18. Thus, the indicia 18 can be or can comprise a laminate with an outer layer 46 disposed over the indicia 18. In one aspect, the outer layer 46 can be transparent or translucent to visible light, such as a clear coat. In another aspect, the outer layer 46 can be opaque to visible light. In another aspect, the outer layer 46 can be transparent or translucent to UV light. Thus, the indicia 18 can be visible to the robot or the augmented reality system or camera or image sensor thereof, even when covered by the finished outer layer 46 of the object. Thus, the aesthetic appearance of the object can be maintained. In addition, the indicia 18 can be applied to the objects during manufacture and at the place of manufacture.

In another example, the indicia 18 can be applied directly to the object without the use of a carrier medium (e.g., such as a label). In one example, the indicia 18 can be applied by printing onto the object using a suitable ink. Many different types of inks are available, such as those that fluoresce at specific wavelengths.

In another aspect, the indicia 18 can be applied or painted on during production of the object. In one aspect, the entire object can be painted with fluorescent paint or covering, and the indicia 18 can be formed by a part that is unpainted or uncovered. In another aspect, the indicia 18 or object can comprise paint that becomes capable fluorescence when another chemical is applied to the paint.

In another aspect, fluorescent markers can be used. For example, the fluorescent markers can include fluorescently doped silicas and sol-gels, hydrophilic polymers (hydrogels), hydrophobic organic polymers, semiconducting polymer dots, quantum dots, carbon dots, other carbonaceous nanomaterials, upconversion NPs, noble metal NPs (mainly gold and silver), various other nanomaterials, and dendrimers.

In another aspect, the indicia 18 can be part of an attached piece. For example, the indicia 18 can be on a handle or trim that is mechanically fastened or chemically adhered to the object. As another example, the indicia 18 can be molded into a polymer of the handle, trim or other part.

Figure 6:
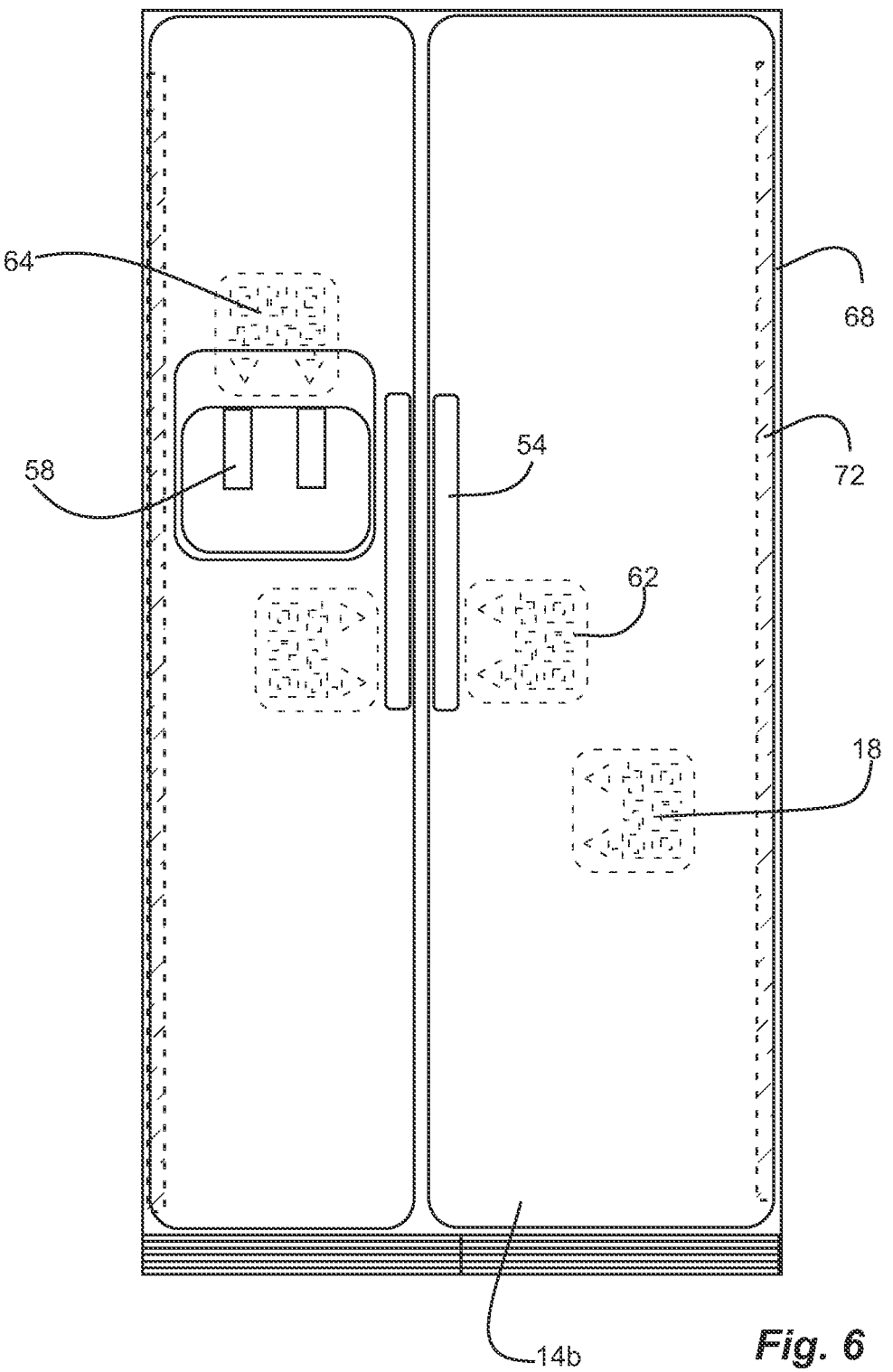
FIG. 6 is a schematic front view of an object of FIG. 2 in accordance with an example.

FIG. 6 depicts a schematic front view of an object, namely a refrigerator 14*b*, in accordance with an example. With reference to FIG. 6, and with continued reference to FIGS. 1 and 2, the object 14*b* can have an interface, such as one or more handles 54 or one or more buttons, knobs or actuators

58. In addition, the object 14*b* can have multiple labels or indicia 18. In one aspect, the indicia 18 can identify the object 14*b* as a refrigerator. In another aspect, other indicia 62 and 64 can identify a location of an interface, or the handle 54 or the actuator 58, respectively. Thus, the object 14*b* can have multiple different indicia 18, 62 and 64 on different parts of a single object, identifying the different parts 54 and 58 of the single object and information on how to interact with them. As described above, the indicia 18 can include an arrow 42 (FIGS. 3*a* and 3*b*) to indicate location of the interface. The indicia 62 and 64 can be disposed or located adjacent to the interface, or handle 54 and actuator 58, of the object so that the arrow 42 is proximal the interface. In addition, the indicia can include other information, or can facilitate access to other information (interaction information), such as a direction of operation (e.g. outwardly, inwardly, downward, to the right or to the left) of the interface or handle, or magnitude or limit of force required to operate the interface. For example, the indicia 62 in FIG. 6 can indicate, or facilitate access to information that indicates, that the object 14*b* is the refrigerator, identify the location of the handle 54, that a force of 10-20 lbs. is required to open the door, that the force applied should not exceed 30 lbs., that the door opens to the right or the maximum rotation of the door is not to exceed 120 degrees, or both. Such information can reduce the calculation time and computational power required by the robot to complete a task, or the time and effort required by the human operator remotely controlling the robot 22 to complete the task, and can reduce the need to learn certain aspects useful or required for interacting with the object(s) as compared to conventional robot control and machine learning systems.

The indicia 18, 62 and 64, can be located or disposed inside a perimeter 68 or lateral perimeter of the object 14*c*. In another aspect, the indicia 72 can be disposed at the perimeter 68 or lateral perimeter of the object 14*c* to help identify the boundaries of the object. The indicia 72 can substantially circumscribe the perimeter of the object.

Figures 7, 8:
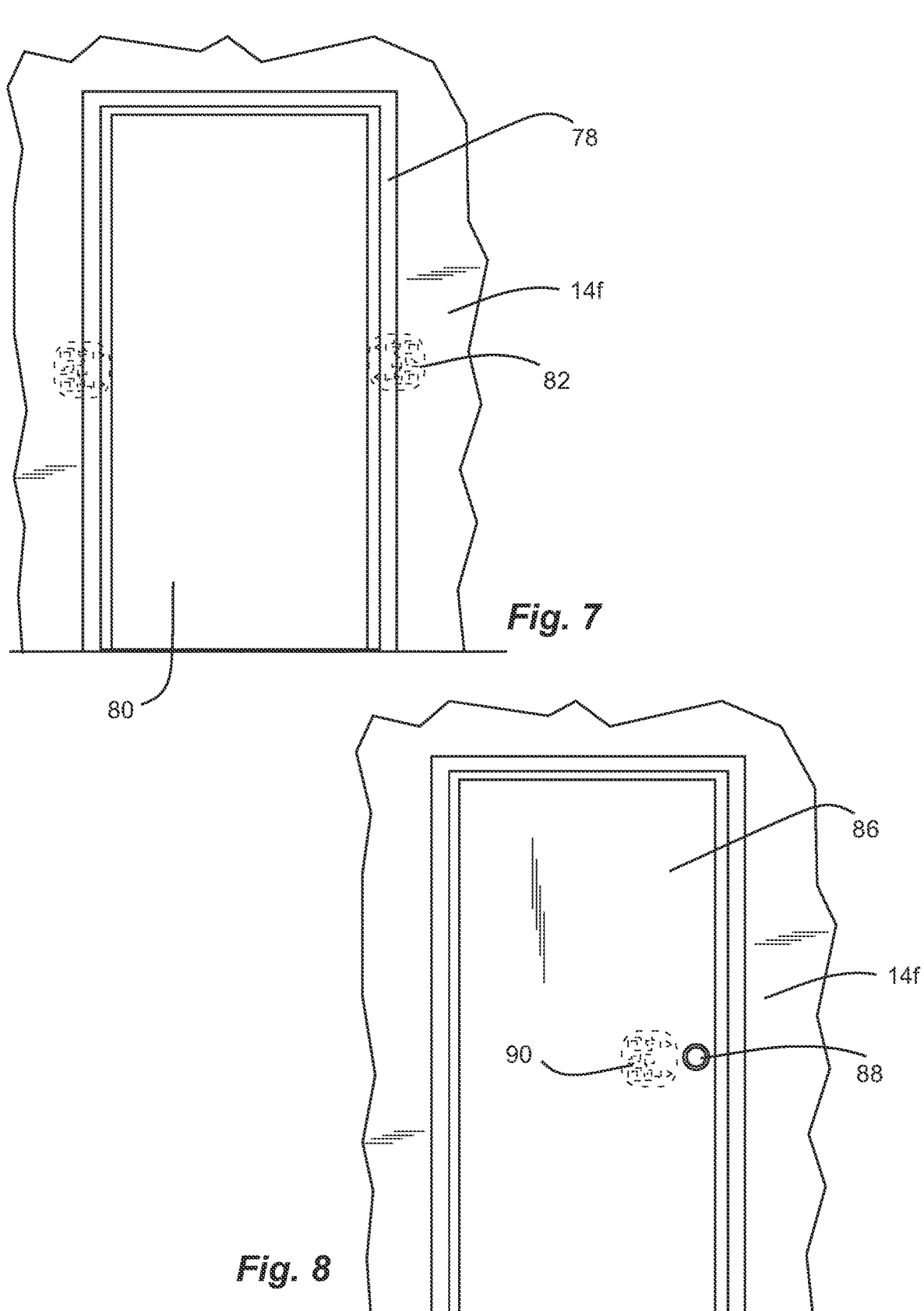
FIG. 7 is a schematic front view of an object of FIG. 2 in accordance with an example.
FIG. 8 is a schematic front view of an object of FIG. 2 in accordance with an example.

FIG. 7 depicts a schematic front view of an object, namely a doorway 78, with an interface, namely the opening 80 therethrough, in accordance with an example. With reference to FIG. 7, and with continued reference to FIGS. 1 and 2, the indicia 82 can be disposed on a wall 14*f* to identify the wall or the doorway 78, and to indicate the interface or opening 80 thereof and other pertinent information. The indicia 82 can be located adjacent to or proximal to the opening 80 at a perimeter thereof.

Similarly, FIG. 8 depicts a schematic front view of an object, namely a door 86, with an interface, namely a doorknob 88, in accordance with an example. With reference to FIG. 8, and with continued reference to FIGS. 1 and 2, the indicia 90 can be disposed on the door 86 to identify the door, and to indicate the interface or the doorknob 88 thereof and other pertinent information. To do so, the indicia 90 can be located adjacent to or proximal to the interface or the doorknob 88, respectively. Again, the indicia 90 can also indicate, or can facilitate access to information that can indicate, the direction of operation of the object or door (e.g. inwardly, outwardly, to the left, to the right), the direction of operation of the interface or doorknob (e.g. clockwise or counter-clockwise), the force required to open the door or the doorknob, etc.

Figure 9:
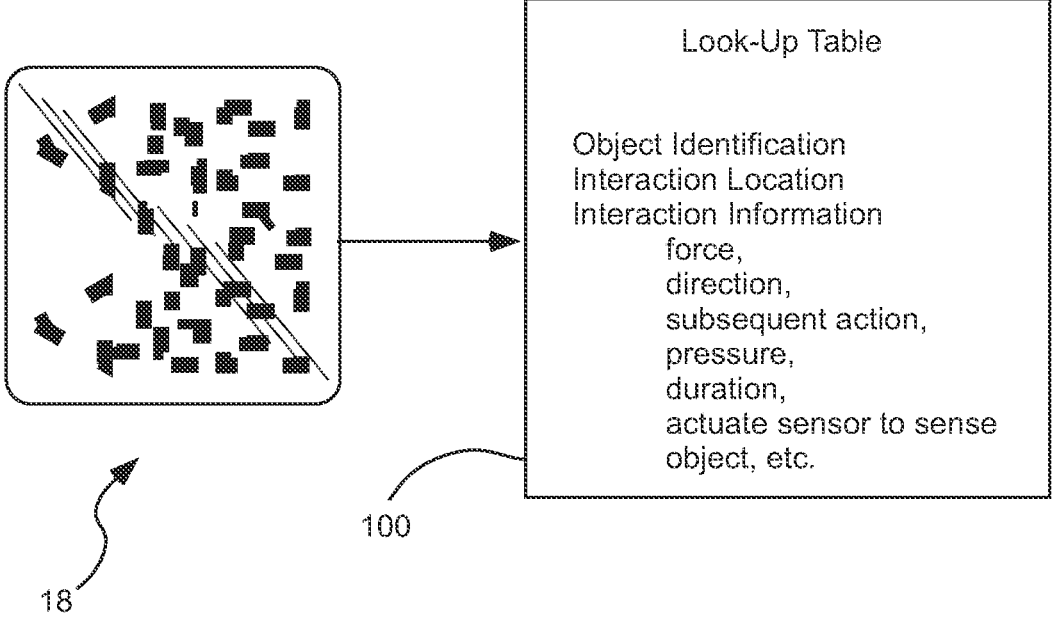
FIG. 9 is a schematic view of look-up table or library of indicia.

FIG. 9 depicts a schematic view of a look-up table 100 or library of information corresponding to the indicia 18. With reference to FIG. 9, and with continued reference to FIGS. 1 and 2, the look-up table 100 or library of information can be stored in the computer database, accessible by at least one of the robot 22 or the augmented reality system via one or more ways as is known in the art. As indicated above, the indicia 18 can identify or facilitate identification of the object 14, a location of an interface of the object 14, indicate or facilitate indication of the physical boundary or barrier thereof, and can comprise or facilitate access to information pertaining to robot interaction (or interaction information or instructions) with the object 14.

As indicated above, in one aspect, the indicia 18 can comprise multiple indicia 18 on a single object 14. In another aspect, the indicia 18 can comprise a series of indicia on a series of objects (e.g., objects 14*a-c*) or a single object 14. Thus, the indicia 18 can comprise a series identifier to indicate its position in the series, which series can comprise a sequence of tasks to be performed by the robot. Indeed, the series of indicia can correspond to a series of objects, or aspects of one or more objects, with which the robot 22 must interact (i.e., perform one or more tasks) in series or in sequence. For example, a first indicium can be associated with the refrigerator door, and can comprise indicia indicating that it is the first in a series of indicia, while a second indicium can be associated with a drawer in the refrigerator, and can comprise indicia indicating that it is the second in the series of indicia, while a third indicium can be associated with a container in the drawer, and can comprise indicia indicating that it is the third in the series of indicia. Thus, if the robot 22 opens the refrigerator door, and looks through the drawer to the container, and thus sees the third indicium, the robot 22 will know that there has been a skip in the sequence and know that it must search for the second indicia. Such a sequence in the indicia can help the robot 22 perform the correct tasks, and can also provide safety to the objects and the robot 22.

In another aspect, the indicia can provide further instructions. For example, the indicia can represent instructions to instruct the robot 22 to turn on a sensor that will be needed to interact with the object.

A method for deploying a robot 22, as part of an augmented reality system or platform as described above, within a machine navigable environment comprises identifying a desired space 12 in which the robot 22 will operate (e.g. a home or kitchen or warehouse, etc.); selecting one or more objects 14 (e.g. a refrigerator 14*d*) that are or will be located in the space 12; marking the one or more objects 14 with indicia 18 being machine-readable and human-imperceptible, the indicia 18 comprising at least one of interaction information or linking information; introducing the robot 22 into the space 12. The robot 22 is capable of movement within the space 12; operating an augmented reality system in communication with the robot 22, the augmented reality system comprising a computer, and operable to convey human-understandable information to a human operator, the human-understandable information corresponding to at least one of the interaction information or the linking information; sensing the human-imperceptible indicia; conveying the human-understandable information to a human operator; and facilitating a predetermined intended interaction with the one or more objects by the robot 22 in accordance with the human-understandable information. In one aspect, conveying human-understandable information to the human operator can comprise conveying the human-understandable information in the form of computer generated imagery (e.g., text, pictures, and other graphics) to at least one of a head mounted display, a screen associated with the augmented reality system, or any other type of display. In one example, the human-understandable information can be superimposed over an electronically transmitted real-world view of the operating space, as generated by the augmented reality system. In another aspect, conveying human-understandable information to the human operator can comprise conveying the human-understandable information in the form of audible information to a speaker associated with the augmented reality system.

The method can further comprise accessing a database containing the interaction information. Access can be carried out by the robot 22, or by the augmented reality system.

In one example, operating the augmented reality system can comprise translating (e.g., processing using suitable translation software) at least one of the interaction information or the linking information into human-understandable information prior to conveying the human-understandable information to the human-operator in order to place the information in a form that the human operator can understand and then use while controlling the robot 22 via the augmented reality system.

The sensing of the human-imperceptible indicia can comprise operating a sensor (e.g., camera 26 and image sensor) on the robot 22, or operating a sensor supported on the augmented reality system, as discussed above.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A robotic system comprising:

a robot;

human-imperceptible indicia associated with an object within an environment in which the robot operates, the human-imperceptible indicia facilitating access to interaction information, the indicia itself comprising at least one of the interaction information or linking information that links to a database comprising the interaction information, wherein the linking information is operable to facilitate access to the database and the interaction information therein by the robot;

at least one sensor operable to sense the human-imperceptible indicia;

an augmented reality system comprising a computer, the augmented reality system in communication with the robot, and operable to convey human-understandable information associated with the interaction information to a human operator, wherein the robot comprises a camera, and wherein the augmented reality system further comprises a visual display viewable by the human operator, the augmented reality system being operable to display, at least in part, an electronically transmitted real-world view of the operating environment on the visual display as captured by the camera, and wherein the augmented reality system further comprises translation software operable to translate the interaction information into the human-understandable information, and to transmit the human-understandable information to the visual display.

2. The robotic system of claim 1, wherein the linking information is operable to facilitate access to the database and the interaction information therein by the augmented reality system.

3. The robotic system of claim 1, wherein the database is supported on the robot.

4. The robotic system of claim 1, wherein the database is supported on the augmented reality system.

5. The robotic system of claim 1, wherein the database is supported on a remote server accessible by at least one of the robot or the augmented reality system over a network.

6. The robotic system of claim 1, wherein the interaction information comprises the human-understandable information, and wherein the augmented reality system operates to transmit the human-understandable information directly to the visual display.

7. The robotic system of claim 1, wherein the sensor operable to sense the human-imperceptible indicia and the linking information is supported on at least one of the computer or a head-mounted display of the augmented reality system, and wherein the sensor is in communication with the camera on the robot configured to transmit image data to the sensor as acquired by the camera from within the operating environment.

8. The robotic system of claim 1, wherein the sensor operable to sense the human-imperceptible indicia and the linking information is supported on the robot.

9. The robotic system of claim 1, wherein the augmented reality system operates to display the human-understandable information in a form of computer-generated imagery superimposed over the transmitted real-world view, the computer-generated imagery being representative of at least some of the interaction information.

10. The robotic system of claim 1, wherein the visual display comprises a head mounted display (HMD).

11. The robotic system of claim 1, wherein the visual display comprises one or more display screens.

12. The robotic system of claim 1, further comprising a tele-operated control system operable with the augmented reality system to facilitate at least partial human operation of the robot within the operating environment.

13. A robotic system comprising:

a robot;

human-imperceptible indicia associated with an object within an environment in which the robot operates, the human-imperceptible indicia comprising interaction information directly thereon pertaining to a predetermined intended interaction of the robot with the object, the interaction information being operable to facilitate interaction with the object by the robot in accordance with the predetermined intended interaction;

at least one sensor operable to sense the human-imperceptible indicia and the interaction information; and an augmented reality system comprising a computer, the augmented reality system in communication with the robot, and operable to convey human-understandable information associated with the interaction information to a human operator, wherein the augmented reality system further comprises translation software operable to translate the human-imperceptible indicia and the interaction information perceived by the at least one sensor into the human-understandable information, and to transmit the human-understandable information to the visual display.

14. The robotic system of claim 13, wherein the robot comprises a camera, and wherein the augmented reality system further comprises a visual display viewable by the human operator, the augmented reality system being operable to display, at least in part, an electronically transmitted real-world view of the operating environment on the visual display as captured by the camera.

15. The robotic system of claim 14, wherein the augmented reality system operates to display the human-understandable information in a form of computer-generated imagery superimposed over the transmitted real-world view, the computer-generated imagery being representative of at least some of the interaction information.

16. The robotic system of claim 14, wherein the visual display comprises a head mounted display (HMD).

17. The robotic system of claim 14, wherein the visual display comprises one or more display screens.

18. The robotic system of claim 13, wherein the interaction information comprises the human-understandable information, and wherein the augmented reality system operates to transmit the human-understandable information perceived by the at least one sensor directly to the visual display.

19. The robotic system of claim 13, wherein the translation software is supported on the robot.

20. The robotic system of claim 13, wherein the translation software is supported on the computer operable with the visual display.

21. The robotic system of claim 13, wherein the at least one sensor is supported on at least one of the computer or a head-mounted display of the augmented reality system, and wherein the at least one sensor is in communication with a camera on the robot configured to transmit image data to the at least one sensor as acquired by the camera from within the operating environment.

22. The robotic system of claim 13, wherein the at least one sensor is supported on the robot.

23. The robotic system of claim 13, wherein the interaction information comprises information pertaining to the object selected from a group consisting of identification information, warning information, status information, direction of travel information, instruction information, sequential robot movement information, and any combination of these.

24. The robotic system of claim 13, further comprising a tele-operated control system operable with the augmented reality system to facilitate at least partial control of the robot within the operating environment, the tele-operated control system further being in communication with the augmented reality system.

25. A method for deploying a robot, as part of an augmented reality platform, within a machine navigable environment, the method comprising:

identifying a desired space in which the robot will operate;

selecting one or more objects that are or will be located in the space;

marking the one or more objects with human-imperceptible indicia being machine-readable, the human-imperceptible indicia comprising at least one of interaction information or linking information that links to a database comprising interaction information;

introducing the robot into the space, the robot being capable of movement within the space;

operating an augmented reality system in communication with the robot, the augmented reality system comprising a computer, and operable to convey human-understandable information to a human operator, the human-understandable information corresponding to at least one of the interaction information, the linked interaction information, or the linking information;

causing the robot to sense the human-imperceptible indicia;

translating at least one of the interaction information, the linked interaction information, or the linking information into the human-understandable information;

conveying the human-understandable information to the human operator; and facilitating interaction with the one or more objects by the robot in accordance with the human-understandable information.

26. The method of claim 25, wherein the conveying human-understandable information to the human operator comprises conveying the human-understandable information to a display associated with the augmented reality system.

* * * * *